United States Patent [19]
Dean, Jr.

[11] 3,768,729
[45] Oct. 30, 1973

[54] DELAYED ACTION DAMPERS FOR AIR TERMINAL UNITS
[75] Inventor: Frank J. Dean, Jr., Kansas City, Mo.
[73] Assignee: Tempmaster Corporation, Kansas City, Mo.
[22] Filed: Aug. 12, 1971
[21] Appl. No.: 171,120

[52] U.S. Cl............... 236/13, 98/38, 137/607, 137/630.19
[51] Int. Cl............................................. F24f 13/04
[58] Field of Search................ 98/38; 137/630.19, 137/607; 236/13, 49

[56] References Cited
UNITED STATES PATENTS
2,339,867  1/1944  Mann, Jr.................... 137/630.19
2,828,768  4/1958  Adams......................... 137/607 X
3,403,852  10/1968 Gorchev....................... 236/13

Primary Examiner—William E. Wayner
Attorney—Lowe, Kokjer, Kircher, Wharton & Bowman

[57] ABSTRACT

An air damper arrangement for a terminal unit that has separate positionable dampers located in the unit to provide for automatic air mixing in response to temperature requirements. In double duct systems, the dampers are mechanically linked in a unique way so that the hot air damper will not begin to open until the cold air damper is partially closed. In this manner, the cold air volume is reduced to a minimum quantity before the hot air is permitted to mixin the terminal unit. Another embodiment utilizes this linkage concept with terminal reheat bypass units to selectively control the dampers associated with the terminal unit heating coil thereby decreasing the volume of air bypassing the coil prior to utilization of same.

8 Claims, 7 Drawing Figures

INVENTOR.
Frank J. Dean Jr.
BY
ATTORNEYS

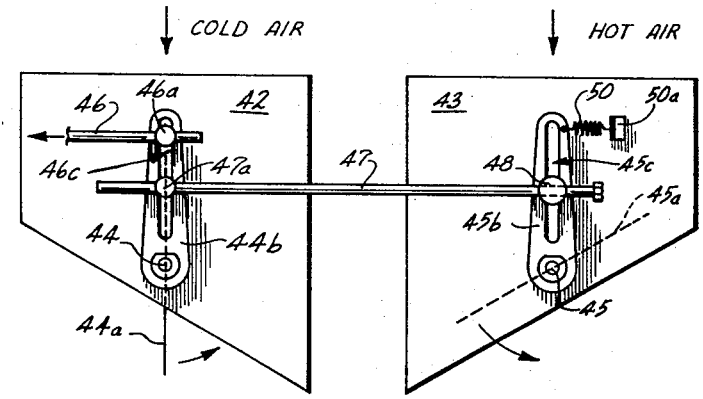
Fig. 3.
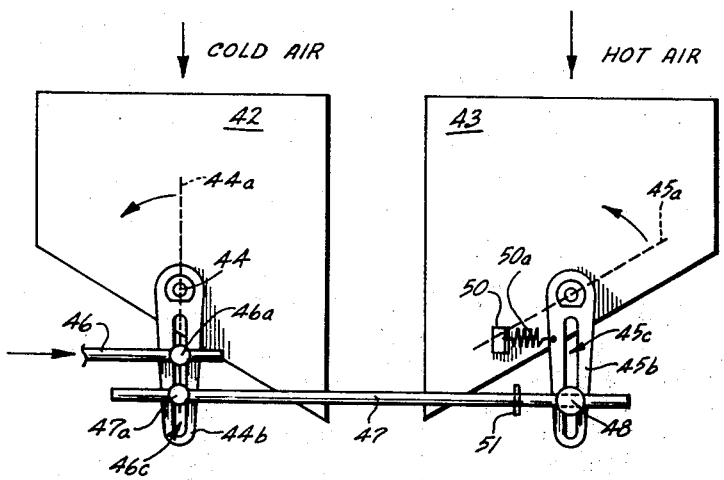
Fig. 4.
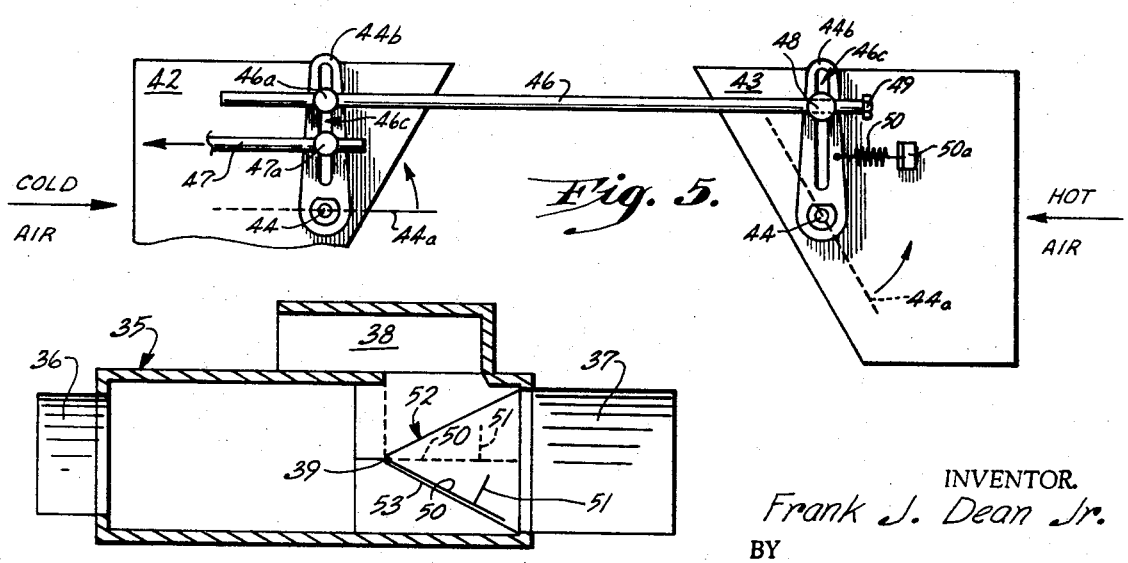
Fig. 5.
Fig. 6.
INVENTOR.
Frank J. Dean Jr.
BY
Sinfield, Kokjer, Sinfield & Low
ATTORNEYS

DELAYED ACTION DAMPERS FOR AIR TERMINAL UNITS

BACKGROUND AND BRIEF DESCRIPTION OF THE INVENTION

Double duct or dual duct hot and cold air mixing devices and terminal units have been used for some time to control temperature in both high and low velocity heating and air conditioning systems. Quite often, the terminal units and/or mixing devices for room temperature control will include provisions for reducing air pressure, attenuating the sound generated in the process, and for controlling the flow of air at a constant volume into the space being temperature conditioned even though inlet air pressures in the hot and cold supply ducts may vary considerably during the system's normal operation.

Recent developments in the double duct approach to temperature conditioning recognize certain inherent disadvantages in conventional mixing devices and/or terminal units. When constant volume systems use double duct terminal units, there has heretofore been a substantial waste of heat or refrigeration involved in the mixing action of hot and cold air for control purposes only. Furthermore, the air distribution ducts were usually larger than necessary because these constant volume systems generally size the hot air duct larger than would be required for heating purposes only, in order to accommodate certain periods when cold air is not required in the room space. Accordingly, the cold air would have to be diverted through the hot ducts since the fan in the constant volume system continually operates to maintain the prescribed volume throughout the system.

More recent developments vary the volume of the hot and cold air through the terminal unit by utilization of a second automatic control operator. In this manner, the conventional practice is to reduce the volume of cold air into a room space before mixing same with hot air. Accordingly, a reduction in the size of the hot air ducts in the system is permitted and the loss of heat due to mixing is minimized. As the overall cold air volume is reduced, less fan horsepower is required thereby further reducing the overall operating cost of the system. The above-mentioned volume control operators were utilized in conjunction with the constant volume control dampers, usually located interiorly of the terminal unit mixing devices. These devices also require a separate independent control operator for the mixing dampers.

The subject invention relates to a terminal air mixing device which accomplishes the purposes described above by utilizing a single control operator that is mechanically linked to both mixing dampers in the unit. The unique linkage is operable with either a low velocity or a high velocity system and includes a split shaft concept for the damper control with the shaft normally interconnected with the control operator having an adjustable means located thereon to induce the mixing action. A separate shaft is axially aligned with respect to the control operator shaft and will have a rigid flap structure in the arcuate path of the time delay mechanism so that the mechanism will contact the flap structure and initiate the mixing action only after a predetermined movement on the part of the operator shaft and the associated cold air damper.

An object of the invention is to provide a uniquely constructed terminal mixing unit for an air distribution.

Another object of the invention is to provide a uniquely constructed damper linkage in a terminal mixing unit normally associated with a double duct system or with a terminal reheat bypass unit.

A still further object of my invention is to provide a unique linkage of the character described above which includes a means for changing the time interval before mixing action will be initiated in the terminal unit. It is a feature of the invention that the time delay action may be afforded either a high or a low velocity unit with the dampers either hinged on one side, off center, or in the middle.

Other embodiments include the use of a terminal reheat bypass unit with a spring loaded operating arm associated with the hot air damper or heating coil damper and links same with a bypass or cold air damper so that the bypass or cold air damper operates the decrease of the air volume therethrough before the hot air damper or heating coil damper operates.

A still further object of my invention is to provide a uniquely constructed linkage for a terminal mixing unit that both reduces the manufacturing cost of the terminal unit and at the same time, reduces the overall operating cost of the associated system.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views:

FIG. 3 is an elevational view of a different embodiment of the linkage utilized to control the hot and cold air dampers of a terminal unit mixing device and with the dampers partially disclosed in broken lines to indicate the operative positions of same within the damper housings.

FIG. 4 is a schematic representation of another embodiment of the above-mentioned linkage;

FIG. 5 is a schematic representation of a third embodiment of the linkage shown in FIG. 3; and FIG. 6 is a sectional view of a low velocity double duct unit with damper hinged on the side embodying the unique damper shaft linkage.

Figure 1:
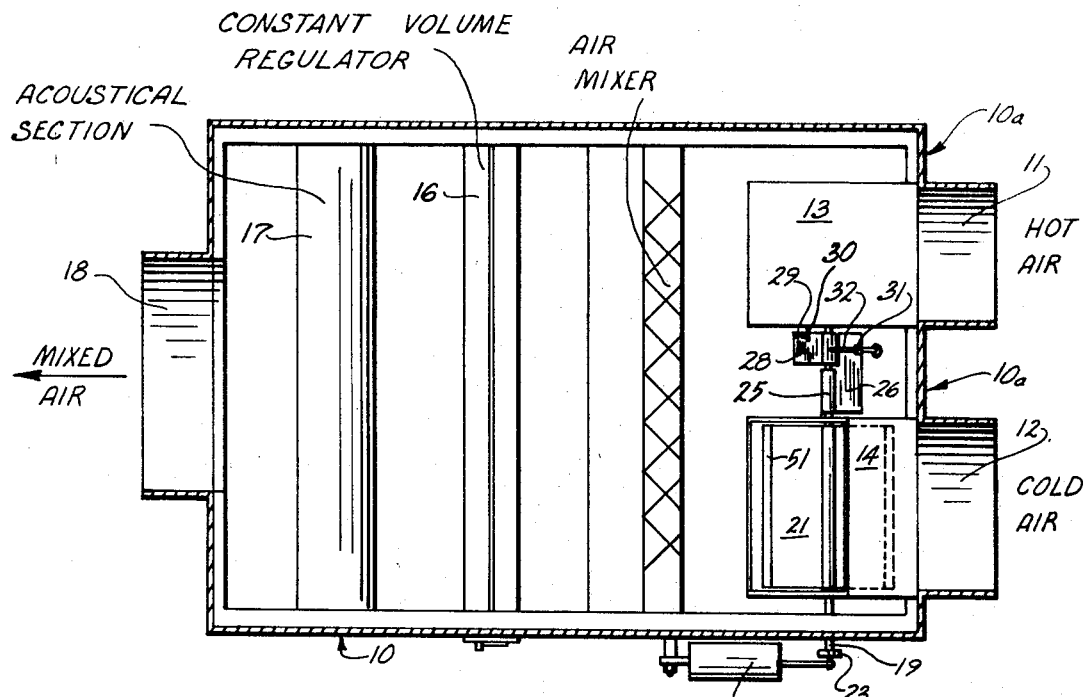
FIG. 1 is a top plan view of the terminal unit with the upper portion of the housing removed to show the damper housings and a portion of the cold air damper in elevation and with same in an opened position.

Turning now more particularly to the drawings (FIG. 1), reference numeral 10 generally indicates the terminal unit housing which is rectangular in cross section and which is adapted to be interconnected with hot and cold air ducts. The terminal unit has inlet connecting ducts 11 and 12 which telescopingly attach with the hot and cold air ducts from the system. The hot air inlet duct may be smaller in diameter and is so shown than the corresponding cold air inlet duct due to unique linkage and control as will be described. As shown in both FIGS. 1 and 2, a suitable structure is located interiorly of the terminal unit and in communication with the above-described inlet ducts to facilitate in the mixing of the conditioned air entering the terminal unit.

Figure 2:
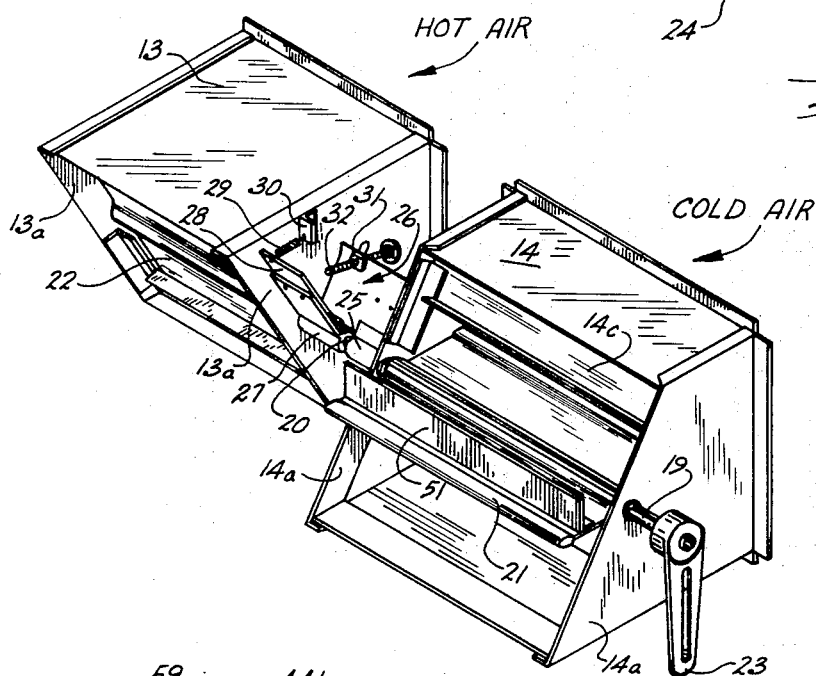
FIG. 2 is a perspective view of the two inlet damper housings and operating linkage shown in FIG. 1.

FIG. 2 is a perspective view of the dampers and damper supporting structures or housings which facilitates the above-described mixing. The unit includes a housing 13 (for the hot air damper) which is similar in construction but oppositely oriented with respect to the housing 14 (for the later described cold air damper). It is contemplated that each damper housing may be constructed of (or any other suitable material) having four flat surfaces that are weldedly interconnected. Further, the upper horizontal flat surface of the hot air duct is longer (with respect to its fore and aft dimension) than the lower flat surface of same so that the forward end extremities of the side housing surfaces (13a), are angled upwardly and forwardly. The cold air damper housing 14 is similarly constructed, however the upper flat horizontal surface is shorter than the lower horizontal surface so that the side surface 14a are angled upwardly and to the rear. Each one of the damper housings has an open rearward face which is weldedly attached to the inner surface of the rear wall 10a of the terminal unit so that the housing is in air tight and communicating relationship with the corresponding inlet ducts. The forward end of the damper housings are, of course, opened save for the possible utilization of a damper retaining flange 14c (FIG. 2) in the cold air and 13c in the hot air (not shown).

An air mixer 15 may be comprised of a plurality of vanes to mix and transmit the air thence to a conventional constant volume regulator 16 and finally through an acoustical section 17 which attenuates the sound and provides for a substantially noiseless operation. Finally, the mixed air is transmitted through outlet 18 and onto conventional grill work or diffusers (not shown).

As suggested above, the forward portion of both of the damper housings are angled in opposite directions. As a result, the approximate midpoint of the forward portions of the side panels intersect when viewed from the side. This provides a mounting surface for a pair of separate but axially aligned grooved shafts 19 and 20. These shafts are mounted on nylon fittings for noiseless operation with respect to the respective housings and as such, shaft 19 extends through the cold air damper housing while shaft 20 is pivotally mounted in a similar manner through the hot air damper housings side walls (see FIGS. 1 and 2). Each of the grooved shafts (19 and 20) is connected to an associated butterfly damper. For instance, shaft 19 interconnects with cold air damper 21 and is operable to rotatively position the damper as required for temperature control. Likewise, the damper 22 is integrally connected with the grooved shaft 20.

The outer end of shaft 19 which extends through the housing of terminal unit 10 has an operating arm 23 affixed thereon. This arm is interconnectable with an automatic damper operator 24 of the type described in Pat. No. 3,363,536. The inner end of shaft 19 which extends past the inner side wall of the hot air damper housing has a collar 25 fixedly attached with the associated slots in shaft 19 with a rigid flap 26 extending radially outwardly therefrom and past the outer end extremity of the combined shaft and collar 25 to a location adjacent the side walls of hot air damper housing 13. As suggested above, the similarly constructed shaft 20 extends through the side walls 13a of the hot air damper housing and is axially aligned with shaft 19. This shaft (20) has a collar 27 attached thereto with a rigid flap 28 extending radially outwardly therefrom. Flap 28 is suitably apertured at the upper and left hand corner thereof to facilitate the mounting of a tension spring 29 between same and a suitable flanged bracket 30 which is weldedly attached to the side wall of the hot air damper housing 13. This spring operates to urge the hot air damper shaft and the hot air damper 22 to rotate to a closed position in a clockwise direction as shown in FIG. 2.

Returning once again to the radial flap 26 which is attached to the collar 25 on the cold air damper shaft 19, the upper left-hand corner of flap 26 is suitably threaded as illustratively depicted by the presence of weldedly attached nut 31. An associated stove bolt 32 (or similar externally threaded device) will extend therethrough to be cooperatively positioned with respect to flap 28. In this manner, as the flap 26 is moved in a counterclockwise direction, the end extremity of the bolt 32 will engage the adjacent surface of flap 28 and import a rotary motion to the damper shaft 20 under tension by spring 29.

The above-described terminal unit operates with the unique damper linkage to reduce the volume of cold air into the terminal unit prior to opening the hot air damper 22. Accordingly, when the damper operator 24 through its control is signalled that the temperature in the room space being conditioned needs to be raised, shaft arm 23 is rotated in a direction (counterclockwise as shown in FIG. 2) by operator 24 that will cause the cold air damper 21 to begin to close thereby reducing the volume of cold air into the terminal unit. As shaft 19 is rotated in this direction, the radial flap 26 moves to and causes the outer end of bolt 32 to engage the radial flap 28 on shaft 20 (the hot air damper shaft). Depending upon the bolt length (32) that extends past the side of flap 26 adjacent flap 28, hot air damper 22 will begin to open via the operation of the bolt end 32 on flap 28. This will occur after a time delay corresponding to the optimal preset decrease of cold air into the terminal unit. This linkage thereby facilitates the utilization of a signal control operator with a terminal unit to increase the efficiency of operation of the overall system since the hot air is not wasted by mixing same with an excessive volume of cold air.

It is contemplated that the above-described shaft linkage may be utilized with a double duct low velocity system having each damper hinged on one side portion instead of in the middle. For instance, the system shown in FIG. 6 is comprised of a terminal unit 35 having inlet ducts generally indicated by the numeral 36 and an outlet duct 37. Also, the unit may have a plenum return 38 that will direct the unused portion of air back into a false ceiling or return air duct. This type of unit is similar to that described in my patent application, Ser. No. 848,496, filed Aug. 8, 1969 and entitled "Temperature Control Terminal Unit." In this unit, a shaft 39 will have the damper 50 and with an associated optional baffle 51 connected thereto in a conventional manner for the purpose of pressure regulation as described in said patent application. (Baffle 51 may also be used with the above-mentioned cold and hot air dampers 21 and 22. The usual control operator will regulate the position of the cold air damper and will move same between damper limit surfaces 52 and 53. In this fashion, the cold air damper will reduce the quantity of air by diverting same back through the plenum duct 38.

The views in FIG. 3-5 represent different embodiments of the damper linkage described in detail with respect in FIGS. 1 and 2. For example, the top of the damper housings are disclosed therein with numeral 42 representing the upper portion of the cold air damper housing while numeral 43 represents the upper portion of the hot air damper in FIGS. 3-5. The shaft that extends through the damper housing to operate the cold air damper in the views is represented by the numeral 44 with the associated damper indicated at 44a. The hot air damper shaft is depicted at numeral 45 with the dampers represented by the numeral 45a. The damper shafts 44 and 45 have operating arms 44b and 45b fixed thereto in a conventional manner to faciliate the interconnection of same with connecting links which will be described.

Turning now more particularly to the embodiment shown in FIG. 3, an interconnecting link 46 is fixedly attached by nut 46a extending through the illustrated slot 46c in operating arm 44b and will impart rotative movement to the arm 44b when link 46 is moved by the control operator of the type mentioned in my Pat. No. 3,363,536. Link 47 is likewise fixedly attached to arm 44b by an appropriate fastener nut 47a and will extend over to a fitting 48 that extends through the illustrated slot 45c in arm 45b. This fitting is suitably apertured to permit the link 47 to slidably extend therethrough, however, the end extremity of link 47 is provided with an oversized hex-headed nut 49 which will engage the side of fitting 48 and not permit the link to be pulled therethrough when link 47 is moved to the left. Finally, the upper portion (as seen in FIG. 3) of arm 45b is suitably apertured to permit a tension spring 50 to be connected at one end thereof with the other end interconnecting with a spring bracket 50a which is attached to the surface 43 of the hot air damper housing. This arrangement permits the operator link 46 to be moved by control operator a preselected distance determined by the distance between the right-hand end of fitting 48 and the left-hand vertical surface of the nut 49 before the damper shaft 45 and damper 45a will be rotated. In this fashion, cold air damper 45a will close or begin to close before hot air damper 45a begins to open. Movement of link 46 back to the rest position (shown in FIG. 3) enables spring 50 to operate on arm 45b and return damper 45a to the closed position.

The embodiment shown in FIG. 4 operates in a similar manner with the exception that a stop pin 51 (alternatively a stop ring could be impressed onto link 47 at any desired location) extends through the diameter of link 47 to the left of fitting 48 and operates to push against fitting 48 as link 47 is moved to the right thereby rotating arm 45b and damper shaft 45. This, of course, operates to open damper 45a as the cold air damper 44a begins to close.

The embodiment shown in FIG. 5 indicates that the hot and cold air enters the respective housings 42 and 43 from the side portions thereof. The movement of the control operator initiates the movement of the link 47 so that link 46 moves arm 45b as link 46 is moved to the left. Accordingly, nut 49 contacts arm 45b in the manner suggested above. This feature further permits the closing of the cold air damper before the hot air damper 45a begins to open.

Figure 7:
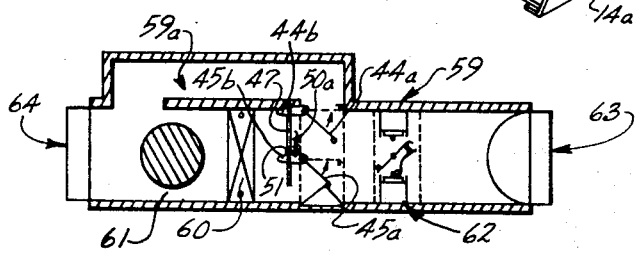
FIG. 7 is a sectional view of a terminal reheat bypass unit embodying the unique damper shaft linkage.

Finally, the terminal reheat bypass unit 59 shown in FIG. 7 utilizes a unique arrangement of volume controllable dampers in conjunction with a linkage of the type shown in FIG. 4. The FIG. 7 terminal unit (59) is somewhat similar to the FIG. 1 embodiment except that a heating coil 60 and the later described dampers and control linkages have been added between the acoustical section 61 and the constant volume regulator 62. Furthermore, there is but a single inlet 63 for interconnection with the cool air supply system.

Terminal unit 59 passes the cool air from inlet 63 through constant volume regulator 62 and from thence to the damper section. With dampers 45a (hot air damper) and 44a (cool air damper) in the solid line portions of FIG. 7, the cool air bypasses heating coil 60 via bypass duct 59a and exits out outlet 64. When it is desirable to heat a room area below the terminal unit 59, a control operator operates the linkage as described above with respect to FIG. 4. Accordingly, the cool air (or bypass) damper 44a begins to close (or will close completely depending on the location of stop pin 51) before the hot air (or heating coil damper) 45a begins to open. When fully operated, the dampers 44a and 45a will assume the broken line portions of FIG. 7 thereby directing all of the air through heating coil 60. Of course, the unit linkage may be adjusted for partial operation supplying partly heated and partly cooled air to the outlet depending on the desired mode of operation.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An air mixing double duct terminal unit comprising a housing, an outlet from said housing, a hot air inlet to said housing connectable with a hot air duct, a damper located interiorly of said housing and movable relative to said hot air inlet to control the volume of hot air passing through said terminal unit and out said outlet, a cold air inlet to said housing connectable with a cold air duct, a damper located interiorly of said housing and movable relative to said cold air inlet to control the volume of cold air passing through said terminal unit and out said outlet, each of said dampers being located on a separate shaft and movable therewith, a temperature control operator means for imparting rotative motion to one of said shafts, and means interconnecting said damper shafts for automatically decreasing the volume of cold air through said terminal unit and out said outlet before said hot air damper is moved to increase the volume of hot air passing through said terminal unit, said interconnecting means being operated in accordance with the temperature requirements dictated by the room area being at least partly temperature conditioned by said terminal unit and as a result of said rotative motion being initiated and imparted to one of said shafts by said temperature control operator means.

2. The combination as in claim 1 wherein said interconnecting means includes a means for delaying the movement of said hot air damper until the volume of air controlled by said cold air damper is decreased a predetermined amount.

3. The combination as in claim 1 wherein each damper is mounted on a separate shaft, a temperature control operator means for imparting rotative motion to said cold air damper shaft to thereby move the cold air damper to control the volume of cold air through said terminal unit, said interconnecting means including means mounted on said cold air damper shaft for rotating said hot air damper shaft to move said hot air damper after a preselected movement of said cold air damper shaft and cold air damper.

4. The combination as in claim 3 wherein said mounted means includes a means for varying the distance of movement of said cold air damper shaft before said hot air damper shaft will be correspondingly rotated.

5. The combination as in claim 3 wherein said damper shafts are axially aligned within said terminal unit housing, and including a means for varying the distance of movement of said cold air damper shaft before said hot air damper shaft will be correspondingly rotated.

6. The combination as in claim 3 wherein said hot air inlet is smaller in diameter than the cold air inlet.

7. The combination as in claim 3 wherein each shaft has a portion thereof extending exteriorly of said unit housing, an operating arm member interconnected with each shaft portion and wherein said interconnecting means includes a link for interconnecting said operating arm members.

8. A terminal unit for conditioned air systems comprising housing, at least one inlet to said housing that is connectable with a conditioned air system, an outlet from said housing, a first damper movably positionable and located within said housing between said inlet and said outlet, a second damper movably positionable and located within said housing between said inlet and said outlet, said first damper operable to regulate the volume of air passing through said unit having a temperature above a preselected minimum, said second damper operable to regulate the volume of air passing through said unit having a temperature generally less than the air temperature controlled by said first damper, each of said dampers being rotatably positionable on a separate and independent shaft, and means interconnecting said damper shafts for moving said second damper to automatically decrease the volume of air regulated by said second damper before said first damper is moved to increase the volume of air regulated by same, said damper shaft movements being initiated by the movement of one of said shafts in accordance with said temperature of the room area being conditioned and said interconnecting means initiating the movement of said other one of said damper shafts.

* * * * *